US008489787B2

(12) United States Patent
Adar et al.

(10) Patent No.: US 8,489,787 B2
(45) Date of Patent: Jul. 16, 2013

(54) SHARING SAMPLED INSTRUCTION ADDRESS REGISTERS FOR EFFICIENT INSTRUCTION SAMPLING IN MASSIVELY MULTITHREADED PROCESSORS

(75) Inventors: Etai Adar, Yokneam Ilit (IL); Russell D. Hoover, Rochester, MN (US); Srinivasan Ramani, Cary, NC (US); Eric F. Robinson, Raleigh, NC (US); Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/902,491

(22) Filed: Oct. 12, 2010

(65) Prior Publication Data

US 2012/0089985 A1    Apr. 12, 2012

(51) Int. Cl.
*G06F 13/24* (2006.01)

(52) U.S. Cl.
USPC ............ 710/260; 710/240; 710/200; 718/100

(58) Field of Classification Search
USPC .......... 710/260–269, 240–244, 200; 718/100; 712/214
See application file for complete search history.

(56) References Cited

U.S. PATENT DOCUMENTS

| | | | |
|---|---|---|---|
| 6,574,727 B1 | 6/2003 | Davidson et al. | |
| 6,748,522 B1 | 6/2004 | Gregoire et al. | |
| 7,200,522 B2 | 4/2007 | Mericas | |
| 7,433,803 B2 | 10/2008 | Circello et al. | |
| 7,461,383 B2 | 12/2008 | Gara et al. | |
| 7,548,832 B2 | 6/2009 | Mericas | |
| 7,657,890 B2 | 2/2010 | Kanai et al. | |
| 7,676,655 B2 * | 3/2010 | Jordan | 712/214 |
| 7,702,887 B1 | 4/2010 | Grohoski et al. | |
| 7,987,345 B2 * | 7/2011 | Silyaev et al. | 712/227 |
| 2002/0144003 A1 | 10/2002 | Jin | |
| 2004/0168098 A1 | 8/2004 | Matsuoka | |
| 2005/0183065 A1 | 8/2005 | Wolczko et al. | |
| 2006/0235648 A1 | 10/2006 | Zheltov et al. | |
| 2007/0143582 A1 | 6/2007 | Coon et al. | |

(Continued)

FOREIGN PATENT DOCUMENTS

| | | |
|---|---|---|
| CN | 101571843 | 11/2009 |
| DE | 3928303 A1 | 2/1991 |

(Continued)

OTHER PUBLICATIONS

U.S. Appl. No. 12/900,667, filed Oct. 8, 2010, Adar et al.
U.S. Appl. No. 12/900,992, filed Oct. 8, 2010, Adar et al.

(Continued)

*Primary Examiner* — Brian Misiura
*Assistant Examiner* — Kim Huynh
(74) *Attorney, Agent, or Firm* — Yee & Associates, P.C.; Daniel H. Schnurmann

(57) ABSTRACT

Sampled instruction address registers are shared among multiple threads executing on a plurality of processor cores. Each of a plurality of sampled instruction address registers are assigned to a particular thread running for an application on the plurality of processor cores. Each of the sampled instruction address registers are configured by storing in each of the sampled instruction address registers a thread identification of the particular thread in a thread identification field and a processor identification of a particular processor on which the particular thread is running in a processor identification field.

14 Claims, 12 Drawing Sheets

U.S. PATENT DOCUMENTS

| | | | |
|---|---|---|---|
| 2007/0150867 A1 | 6/2007 | Barsness et al. | |
| 2007/0168985 A1 | 7/2007 | Konishi et al. | |
| 2008/0195851 A1 | 8/2008 | Hoogerbrugge | |
| 2008/0294881 A1 | 11/2008 | Chen et al. | |
| 2009/0089014 A1 | 4/2009 | Silyaev et al. | |
| 2010/0042997 A1 | 2/2010 | Lev | |
| 2010/0095300 A1 | 4/2010 | West et al. | |
| 2010/0158005 A1* | 6/2010 | Mukhopadhyay et al. ... | 370/392 |

FOREIGN PATENT DOCUMENTS

| | | |
|---|---|---|
| EP | 750255 A2 | 12/1996 |
| EP | 0969379 A2 | 1/2000 |
| EP | 1321856 A2 | 6/2003 |
| WO | 2006079940 | 3/2006 |

OTHER PUBLICATIONS

Treibig et al., "LIKWID: A lightweight performance-oriented tool suite for x86 multicore environments", 2010, Accepted for PSTI2010, the First International Workshop on Parallel Software Tools and Tool Infrastructures, San Diego CA, Sep. 13, 2010. arXiv:1004.4431, pp. 1-7.

Maxwell et al., "Accuracy of performance monitoring hardware", Proc. LACSI Symposium, Santa Fe NM, 2002, pp. 1-21.

Moore et al., "Thread Level Transactional Memory", Mar. 31, 2005, Technical Report 1524, Computer Sciences Dept., UW-Madison, pp. 1-11.

Office Action issued on Jan. 16, 2013 for U.S. Appl. No. 12/900,667, 19 pages.

\* cited by examiner

SHARING SAMPLED INSTRUCTION ADDRESS REGISTERS FOR EFFICIENT INSTRUCTION SAMPLING IN MASSIVELY MULTITHREADED PROCESSORS

BACKGROUND

1. Field

The disclosure relates generally to data processing and more specifically to sampling instructions in multithreaded processors.

2. Description of the Related Art

Chips may contain multiple processors with multiple processor cores. Such chips may be capable of handling a large number of threads. Processor cores may have built-in performance instrumentation that monitors various performance-related events occurring during operation of the processor and the processor core. Performance instrumentation may consist of performance monitor units that provide counters, support for selecting and for routing event signals to those counters, and registers to hold sampled instruction addresses. Performance monitor units may also interrupt one or more processors in response to a condition being met. For example, interruption of a thread on a processor may be necessary in response to a counter overflow to support instruction sampling. An interrupt signal to the processor may be used to freeze a sampled instruction address register (SIAR) containing the address of an instruction that is executing at the time the trigger condition occurred, or that has recently completed execution. One sampled instruction address register is needed for each thread that has to be profiled simultaneously. In massively multithreaded processors, the amount of sampled instruction address registers may take up significant area inside the processor core area.

BRIEF SUMMARY

According to one embodiment of the present invention, sampled instruction address registers are shared among multiple threads executing on a plurality of processor cores. Each of a plurality of sampled instruction address registers are assigned to a particular thread running for an application on the plurality of processor cores. Each of the sampled instruction address registers are configured by storing, in each of the sampled instruction address registers, a thread identification of the particular thread in a thread identification field and a processor identification of a particular processor on which the particular thread is running in a processor identification field.

DETAILED DESCRIPTION

Figure 1:
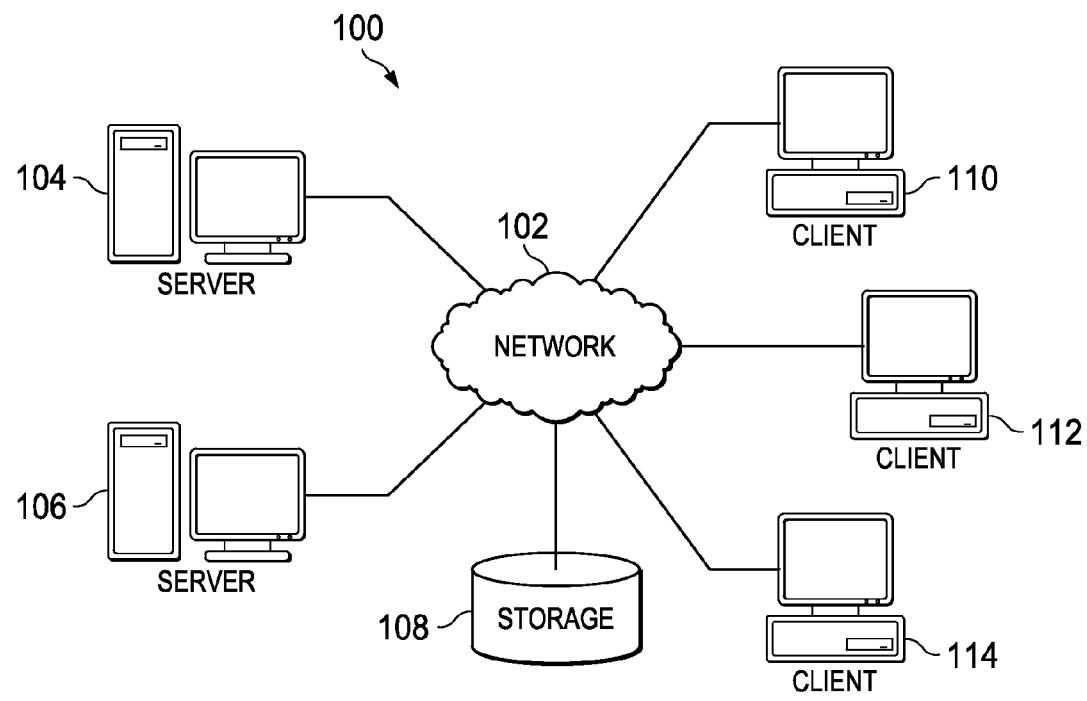
FIG. 1 is an illustrative representation of a network of data processing systems depicted in which illustrative embodiments may be implemented.

The illustrative embodiments recognize and take into account that in order to support instruction sampling on multiple threads and multiple processor cores, existing sampled instruction address registers may be assigned to each thread inside a processor core, or sampled instruction address registers may be time-sliced inside the processor core.

The illustrative embodiments recognize and take into account that numerous threads may run in a processor chip. Assigning a sampled instruction address register to each thread takes up area in the processor core. Also, the processor core may be used in chip implementations where instruction sampling is not required. Moreover, instruction sampling may be done on a subset of threads simultaneously, and in these cases, providing a sampled instruction address register per thread may be inefficient. For example, if one sampled instruction address register is time-sliced across multiple threads in a processor core, only one thread can be profiled at a time. Profiling one thread at a time prevents simultaneous instruction sampling of an application running multiple threads. Thus, application-wide profiling is not possible.

The illustrative embodiments recognize and take into account that where sampled instruction address registers are shared, system software may dynamically assign sampled instruction address registers to threads and processor cores. The thread identification (TID) and the processor identification (PID) fields may be used to specify this assignment.

The illustrative embodiments provide a method for system software to dynamically assign sampled instruction address registers to threads via special fields in the sampled instruction address registers so that sampled instruction address registers may be shared among multiple threads, multiple processor cores, and multiple threads and multiple processor cores.

The illustrative embodiments recognize and take into account that an embodiment may provide one sampled instruction address register per thread, or provide fewer sampled instruction address registers than the number of threads. In the latter case, system software may assign available sampled instruction address registers to application(s) that need to be sampled. In an embodiment, sampled instruction address registers may be operably coupled outside any of the processor cores, allowing them to be shared among multiple processor cores.

The illustrative embodiments recognize and take into account that a bus may carry instruction addresses, thread identification, processor identification, and other information required to fully characterize a sample to all sampled instruction address registers. The illustrative embodiments recognize and take into account that multiple functional units, such as pipelines, multiple threads within a processor core, or multiple processor cores may send instruction information on the same bus in the same clock, and a collision resolution scheme may be needed. A collision resolution scheme may be a round-robin scheme, a priority scheme, or some other collision resolution scheme. To avoid collisions completely, the number of buses should equal the number of instruction address generators. For example, if up to one address can be generated by a thread in any clock cycle, there should be one bus per thread.

The illustrative embodiments recognize and take into account that a sampled instruction address register assigned to a particular thread may be frozen, while leaving sampled instruction address registers assigned to other threads active. Similarly, a frozen sampled instruction address register belonging to a particular thread and processor core can be unfrozen by software such as an interrupt handler without affecting sampled instruction address registers belonging to other threads and processor cores. The shared sampled instruction address registers may be operably coupled within a processor core, in which case all threads in the processor core may share the sampled instruction address registers. Sampled instruction address registers may be operably coupled outside processor cores and, in this case, the sampled instruction address registers may be shared among multiple processor cores. Sampled instruction address registers may be operably coupled outside any processor core, and may be accessible via memory-mapped input/output (MMIO).

The illustrative embodiments recognize and take into account that chips may have multiple processor cores in a chip and that it is possible for each processor core to belong to a different partition. Security breaches may arise if the shared sampled instruction address registers are operably coupled outside the processor cores and are accessible by many processor cores. In such cases, an illustrative embodiment may split a shared pool of sampled instruction address registers into a number of groups of sampled instruction address registers, and assign each group of sampled instruction address registers to a separate page in a system memory map. By setting access control attributes in the memory management units inside each processor core appropriately, a particular processor core may be restricted to accessing only sampled instruction address register groups that belong to the same partition as the particular processor core. The illustrative embodiments recognize and take into account that in order to prevent instruction address bus signals from being visible at sampled instruction address registers belonging to a different partition, control fields may be provided in a hypervisor-accessible register to zero out all signals that cross over from one partition to another.

Referring to FIG. 1, an illustrative representation of a network of data processing systems is depicted in which illustrative embodiments may be implemented. Network data processing system 100 may be a network of computers in which the illustrative embodiments may be implemented. Network data processing system 100 contains network 102, which may be the medium used to provide communications links between various devices and computers operably coupled together within network data processing system 100. Network 102 may include connections, such as wire, wireless communication links, or fiber optic cables.

In the illustrative embodiment, server computer 104 and server computer 106 operably coupled to network 102 along with storage unit 108. In addition, client computers 110, 112, and 114 operably coupled to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the illustrative embodiment, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation, for the different illustrative embodiments.

Figure 2:
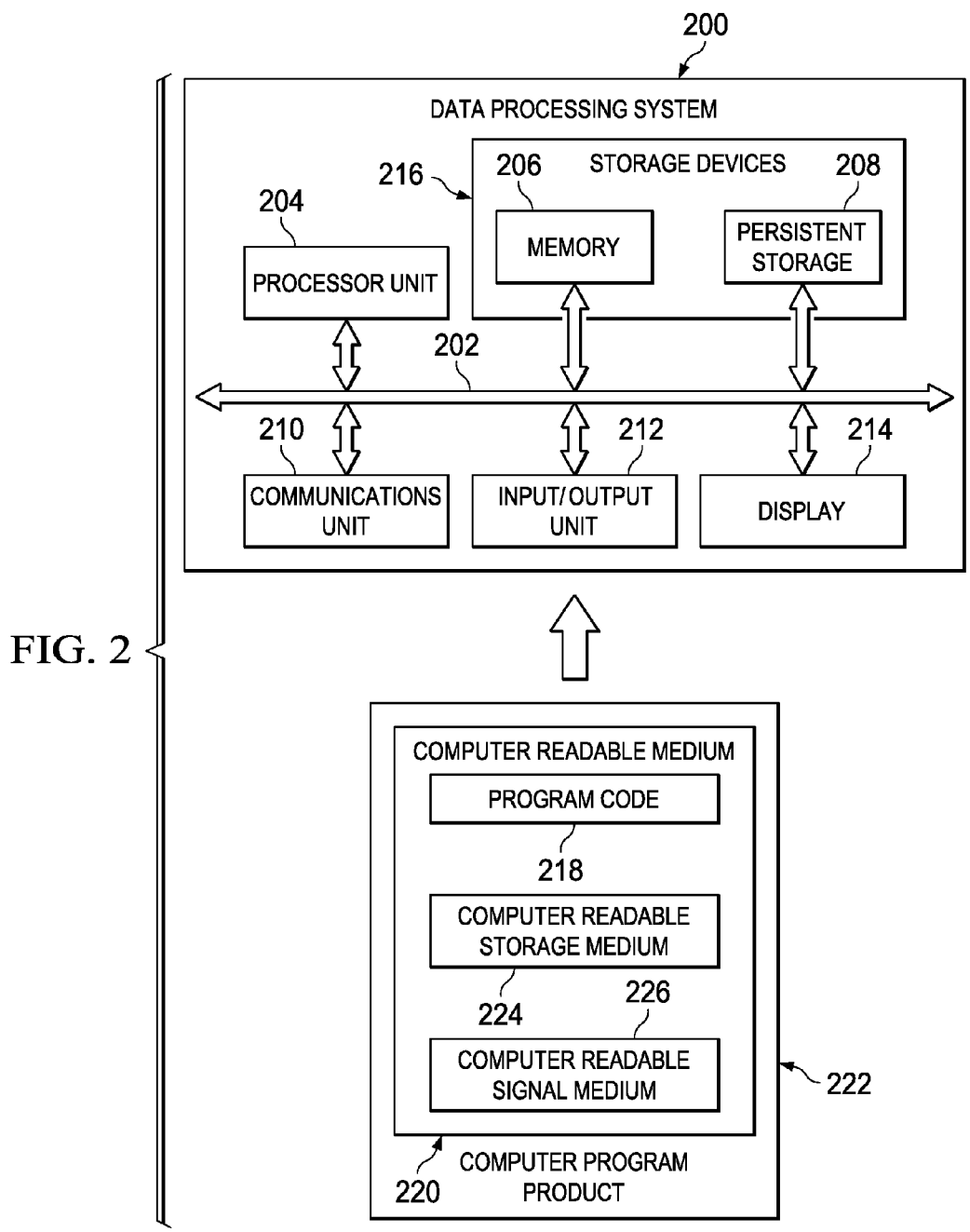
FIG. 2 is an illustration of a data processing system depicted in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor may be present with secondary processors on a single chip. As another illustrative example, processor unit 204 may be a symmetric multi-processor system containing multiple processors of the same type.

Memory 206 and persistent storage 208 are examples of storage devices 216. A storage device may be any piece of hardware that may be capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory, or any other suitable volatile or non-volatile storage device, with power management features like support for various lower power states. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 also may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links.

Input/output unit 212 allows for input and output of data with other devices that may be operably coupled to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be in a memory, such as memory 206.

These instructions are referred to as program code, computer usable program code, or computer readable program code that may be read and run by a processor in processor unit 204. The program code in the different embodiments may be embodied on different physical or computer readable storage mediums, such as memory 206 or persistent storage 208.

Program code 218 may be in a functional form on computer readable medium 220 that may be selectively removable and may be loaded onto, or transferred to, data processing system 200 for running by processor unit 204. Program code 218 and computer readable medium 220 form computer program product 222 in these examples. In one example, computer readable medium 220 may be computer readable storage medium 224 or computer readable signal medium 226. Computer readable storage medium 224 may include, for example, an optical or magnetic disk that may be inserted or placed into a drive or other device that may be part of persistent storage 208 for transfer onto a storage device, such as a hard drive, that may be part of persistent storage 208. Computer readable storage medium 224 also may take the form of a persistent storage, such as a hard drive, a thumb drive, or a flash memory, that may be operably coupled to data processing system 200. In some instances, computer readable storage medium 224 may not be removable from data processing system 200.

Alternatively, program code 218 may be transferred to data processing system 200 using computer readable signal medium 226. Computer readable signal medium 226 may be, for example, a propagated data signal containing program code 218. For example, computer readable signal medium 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 may be any hardware apparatus that may store data. Memory 206, persistent storage 208, and computer readable medium 220 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
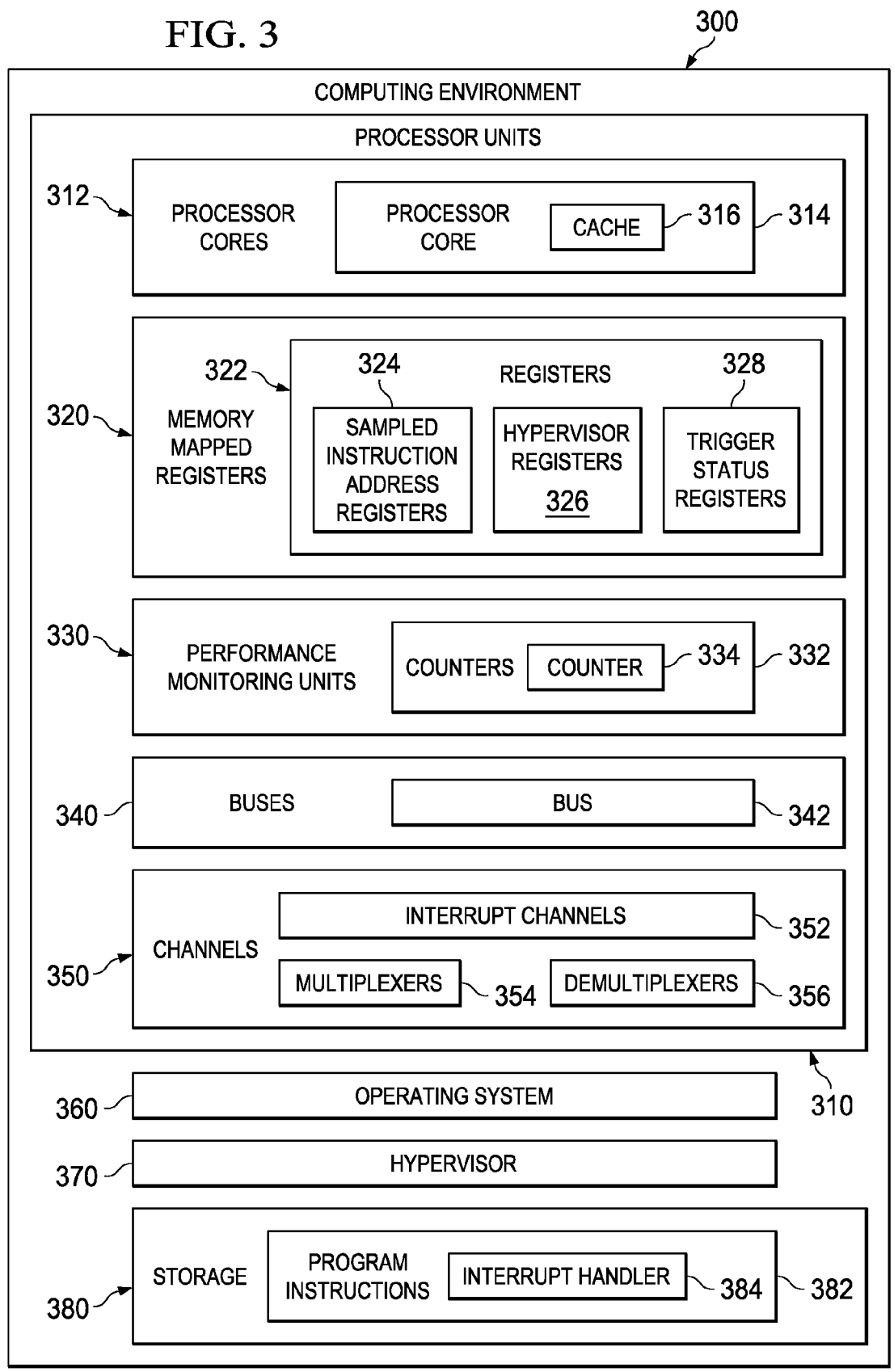
FIG. 3 is an illustration of a computing system environment in which the illustrative embodiments may be implemented.

Referring to FIG. 3, a computing system environment is depicted in which the illustrative embodiments may be implemented. Computing environment 300 comprises processor units 310, operating system 360, hypervisor 370, and storage 380. Processor units 310 comprise processor cores 312, memory mapped registers 320, performance monitoring units 330, buses 340, and channels 350. Processor cores 312 comprise a number of processor cores, such as processor core 314. Processor core 314 may further comprise cache 316. Memory mapped registers 320 may comprise registers 322. Registers 322 may comprise sampled instruction address registers 324, hypervisor registers 326, and trigger status registers 328. The illustrative embodiments recognize and take into account that one sampled instruction address register is necessary for each thread that may be monitored simultaneously while running on processor cores 312. As used herein and in the drawings, "p" shall refer to a number of processor cores.

As used herein "n" shall refer to a number of threads running on one or more processor cores. The illustrative embodiments recognize and take into account that there may be multiple trigger status registers and, in that case, the trigger status register may be p*n bits wide. The illustrative embodiments recognize and take into account that sampled instruction address registers, such as sampled instruction address registers 324, may contain a number of special fields, and that the number of special fields are configured to allow system software, such as program instructions 382 in storage 380, and program instructions that are part of operating system 360 or hypervisor 370, to dynamically assign individual sampled instruction address registers to a number of threads running on processor cores 312. In addition, system software may be contained in program instructions 382 in storage 380 or in instructions that are part of operating system 360 or hypervisor 370 for setting performance counters.

Figure 5:
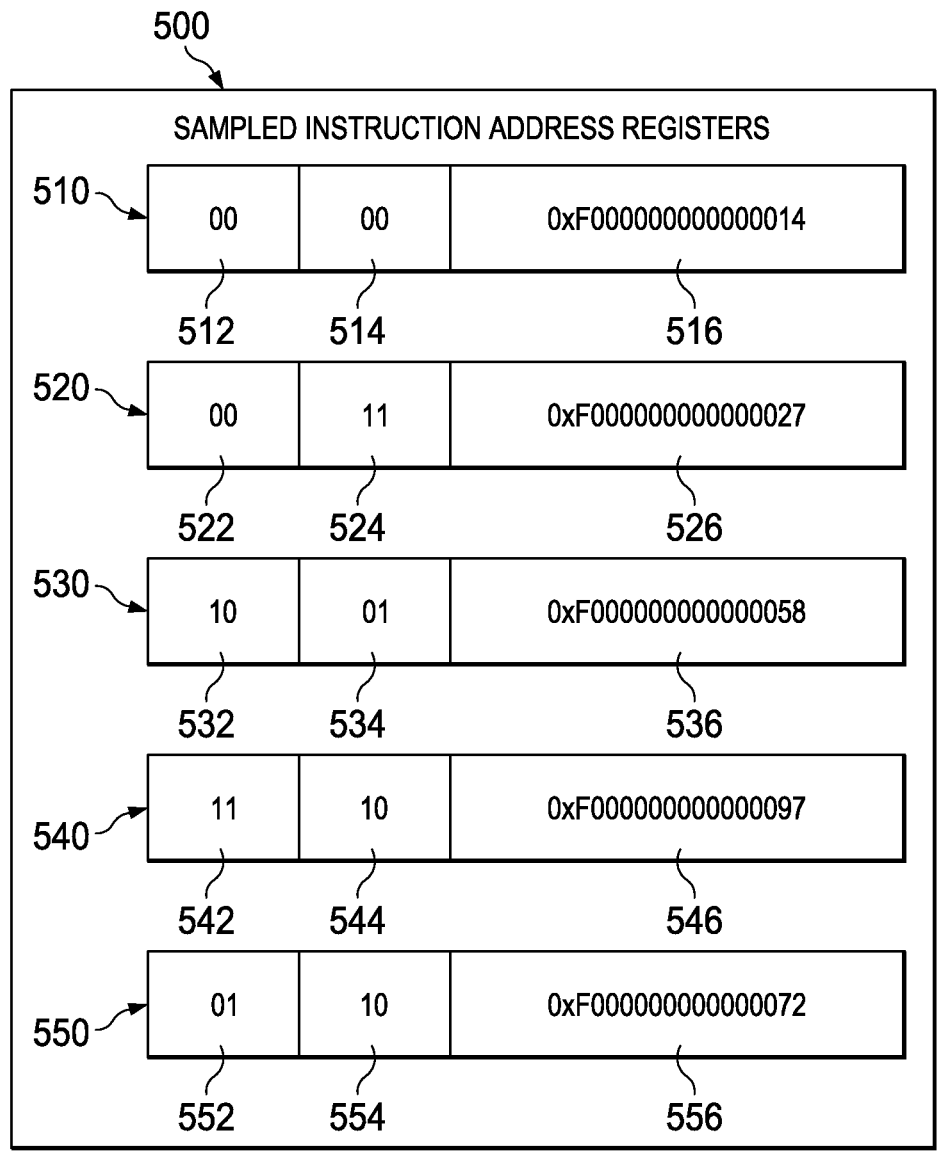
FIG. 5 is an illustration of a sampled instruction address register depicted in accordance with an illustrative embodiment.

Illustrative embodiments of such special fields are shown in FIG. 5. Performance monitoring units 330 may comprise a number of counters, such as counters 332. Counters 332 may comprise a counter, such as counter 334. The illustrative embodiments recognize and take into account that performance monitoring units, such as performance monitoring units 330, may provide counters, such as counters 332, as well as support for selecting and routing event signals to counters 332 and to registers, such as sampled instruction address registers 324, via buses 340.

The illustrative embodiments recognize and take into account that performance monitoring units, such as performance monitoring units 330, may provide an ability to monitor a number of performance-related events that occur during running of a number of threads through processor cores 312. The illustrative embodiments recognize and take into account that performance monitoring units, such as performance monitoring units 330, may be configured to interrupt processor cores 312 of processor units 310 in response to a condition being met. An illustrative example of a condition may be in response to a counter overflow. The illustrative embodiments recognize that an interruption in response to a counter overflow may be necessary to support instruction sampling.

Buses 340 may comprise a number of buses such as bus 342. Channels 350 may comprise a number of interrupt channels 352, a number of multiplexers 354, and a number of demultiplexers 356. Multiplexers 354 are configured in front of sampled instruction address registers for selecting and routing an interrupt signal from the interrupt channel to the freeze signal of the sampled instruction address registers. Demultiplexers 356 may select a trigger status register bit to set according to the thread identification and the processor identification in the performance counter that caused an interrupt event.

Counters 332 may be configured, upon occurrence of a condition, to set a bit in a trigger status register, such as trigger status registers 328. A trigger status register, such as trigger status registers 328, may send a signal via a channel such as interrupt channel 352 to a processor core such as processor core 314, or a specific thread on that processor core, and via a multiplexer such as multiplexer 354 to a sampled instruction address register, such as sampled instruction address register 324. Storage 380 may comprise a number of program instructions, such as program instructions 382. System software may be contained in program instructions 382 in storage 380, or in instructions that are part of operating system 360 or hypervisor 370, for setting performance counters, as well as for other actions. Program instructions 382 may comprise interrupt handler 384.

Figure 4:
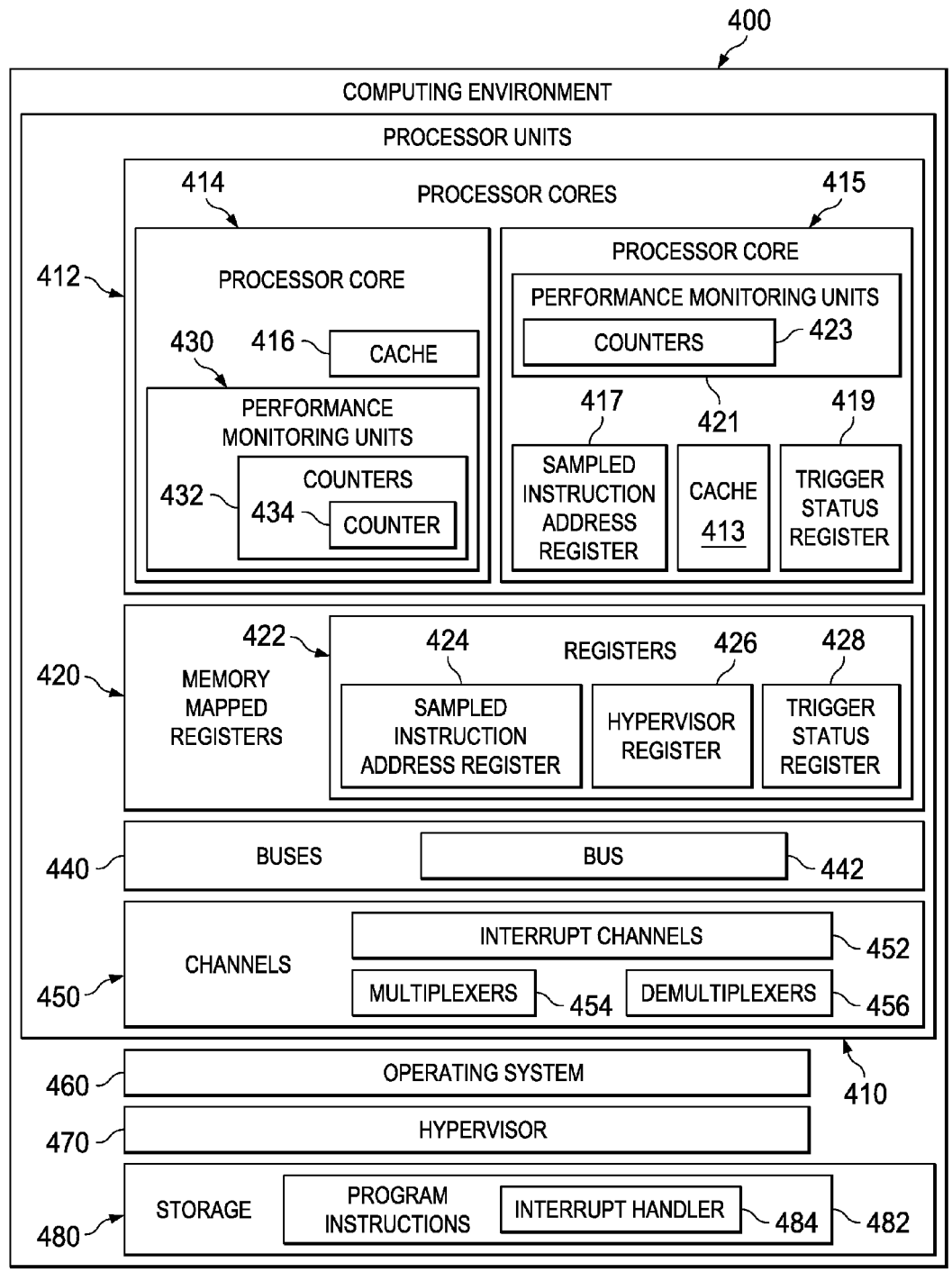
FIG. 4 is an illustration of an alternate computing system environment in which the illustrative embodiments may be implemented.

Referring to FIG. 4, an illustration of an alternate embodiment of a computing environment is disclosed in accordance with an illustrative embodiment. FIG. 4 is similar to FIG. 3 in that it depicts an illustrative example of a computing environment. In this case, computing environment 400 is the same as computing environment 300 in FIG. 3 with the exception that computing environment 400 has a number of different processor units 410. Processor units 410 may differ from processor units 310 in FIG. 3 because processor units 410 may have a number of processor cores, such as processor core 414 and processor core 415. Processor core 414 may have performance monitoring units 430 operably coupled within processor cores 414 along with cache 416. Processor core 415 may have cache 413, sampled instruction address register 417, trigger status register 419, and performance monitoring unit 421 inside processor core 415. Performance monitoring unit 421 may have counters 423.

In FIG. 3, processor units 310 have performance monitoring units 330 operably coupled outside of processor cores 312 and within processor units 310. In FIG. 4, performance monitoring units are operably coupled to processor core 414 and processor core 415. Performance monitoring units 430 may be operably coupled to processor core 415. Performance monitoring units 421 may be operably coupled to processor core 415. Performance monitoring units 430 may comprise a number of counters 432. A counter in number of counters 432 may be counter 434. Performance monitoring units 421 in processor core 415 may comprise counters 423. In regard to other components, computing environment 400 is substantially the same as computing environment 300.

The illustrative embodiments recognize and take into account that the plurality of sampled instruction address registers may be stored in a sampled instruction address registry operably coupled outside the plurality of multiple processor cores as shown in FIG. 3 and in memory mapped registers 420 of processor units 410 in FIG. 4. In response to sampled instruction address registers and trigger status registers being operably coupled inside the processor cores such as shown in processor core 415 in FIG. 4, only the thread identification field may be required.

The illustrative embodiments recognize and take into account that any combination of processor cores such as processor core 414 and processor core 415 may be employed in computing environment 400 as well as other embodiments of processor cores.

Referring to FIG. 5, an illustration of a sampled instruction address register is depicted in accordance with an illustrative embodiment. As used herein, processor identifications shall refer to processor core identifications. The illustrative embodiments recognize and take into account that the thread identification field and the processor identification field may each be two bits wide corresponding to four threads in each processor core and four processors in the environment. The sampled instruction address field of the sampled instruction address register may be sixty four bits wide. Sampled instruction address register 500 may be sampled instruction address register 324 in FIG. 3 or 424 FIG. 4. Sampled instruction address register 500 comprises a number of sampled instruction address registers, such as first sampled instruction address register 510, second sampled instruction address register 520, third sampled instruction address register 530, fourth sampled instruction address register 540, and fifth sampled instruction address register 550.

In the illustrative example of FIG. 5, first sampled instruction address register 510 comprises first thread identification field 512 that may have a first thread identification value of 00, first processor identification field 514 that may have a first processor identification 2 bit value of 00, and first sampled instruction address register field 516 that may have a first sampled instruction address register 64 bit value of 0xF000000000000014. Second sampled instruction address register 520 may have second thread identification field 522 that may have a second thread identification value of 00, second processor identification field 524 may have a second processor identification value of 11, and second sampled instruction address register field 526 may have a second sampled instruction address register field value of 0xF000000000000027.

Third sampled instruction address register 530 may have third thread identification field 532 having a third thread identification value of 10, third process identification field 534 having a third processor identification value of 01, and third sampled instruction address register field 536 having a third sampled instruction address register value of 0xF000000000000058.

Fourth sampled instruction address register 540 may have fourth thread identification field 542 having a fourth thread identification value of 11, fourth processor identification field 544 having a fourth process identification value of 10, and fourth sampled instruction address register field 546 having a fourth sampled instruction address register value of 0xF000000000000097. Fifth sampled instruction address register 550 may have fifth thread identification field 552 having a fifth thread identification value of 01, fifth processor identification field 554 having a fifth processor identification value of 10, and fifth sampled instruction address register field 556 having a fifth sampled instruction address register value of 0xF000000000000072.

Figure 6:
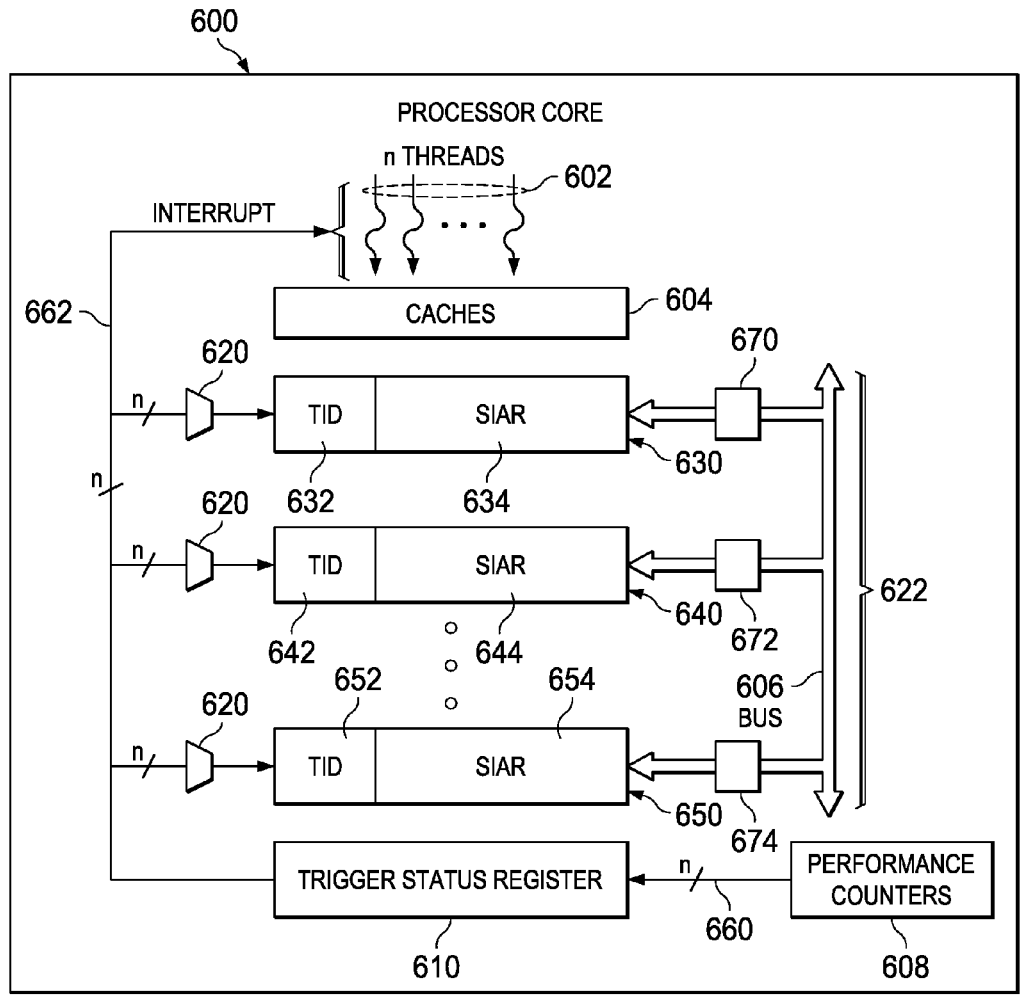
FIG. 6 is an illustration of shared sampled instruction address registers in a single processor core depicted in accordance with an illustrative embodiment.

Turning to FIG. 6, an illustration of shared sampled instruction address registers in a single processor core is depicted in accordance with an illustrative embodiment. Processor core 600 may be a processor core, such as processor core 415 in FIG. 4 having counters 423, sampled instruction address register 417, and trigger status register 419 in processor core 415.

The illustrative embodiments recognize and take into account that sampled instruction address registers and trigger status registers may be operably coupled inside the processor cores such as shown in processor core 415 in FIG. 4, and in that case, only the thread identification field may be required. Processor core 600 may have a number of threads 602 and a number of caches 604 and a number of sampled instruction address registers 622 and a number of trigger status registers 610. First sampled instruction address register 630 may comprise first thread identification value 632 and first sampled instruction address register value 634. Second sampled instruction address register 640 may comprise second thread identification value 642 and second sampled instruction address register value 644. Third sampled instruction address register 650 may represent any number of sampled instruction address registers. Third sampled instruction address register 650 may comprise third thread identification 652 and third sampled instruction address value 654.

In response to any of the performance counters 608 determining that a trigger condition has been met for a thread, such as one of a number of threads 602 running in processor core 600, performance counters 608 sets a bit for the thread in trigger status register 610 via channel 660. Trigger status register 610 sends an interrupt signal along channel 662 to one or more threads in number of threads 602, and freezes each sampled instruction address register corresponding to each of the interrupted threads via multiplexers, such as multiplexers 620 operably coupled to channel 662. First sampled instruction address register 630, second sampled instruction address register 640, and third sampled instruction address register 650 receive instruction address values, thread identifications, and any other information via bus 606. Bus 606 may be one of buses 340 in FIG. 3 or one of buses 440 in FIG. 4 and channel 662 may be one of interrupt channels 352 in FIG. 3 or one of interrupt channels 452 in FIG. 4. First sampled instruction address register 630, second sampled instruction address register 640, and third sampled instruction address register 650 may be from sampled instruction address register 417 in FIG. 4. Compare units 670, 672, and 674 determine whether an instruction address on bus 606 will be stored in the corresponding sampled instruction address values 634 through 654, as illustrated in FIG. 7.

Figure 7:
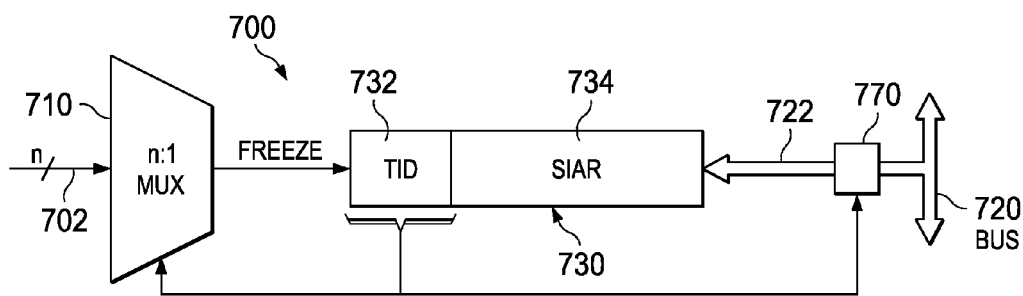
FIG. 7 is an illustration of a sampled instruction address register having a thread identification and the associated mechanisms to selectively freeze the sampled instruction address register depicted in accordance with an illustrative embodiment.

Referring to FIG. 7, an illustration of a sampled instruction address register having a thread identification and the associated mechanisms to selectively freeze the sampled instruction address register is depicted in accordance with an illustrative embodiment. Signal 702 from an interrupt channel, such as interrupt channel 662 in FIG. 6, passes through multiplexer 710 to freeze sampled instruction address register 730. Sampled instruction address register 730 receives a thread identification value 732 from system software, such as program instructions 382 in storage 380 in FIG. 3, program instructions that are part of operating system 360 in FIG. 3, hypervisor 370 in FIG. 3, operating system 460 in FIG. 4, or hypervisor 470 in FIG. 4. Bus 720 and connecting bus 722 may be buses such as buses 340 in FIG. 3, buses 440 in FIG. 4, and bus 606 in FIG. 6. Multiplexer 710 may be a multiplexer such as one of multiplexers 354 in FIG. 3, one of multiplexers 454 in FIG. 4, or may be one of multiplexers 620 in FIG. 6. Multiplexers 354 in FIG. 3, multiplexers 454 in FIG. 4, multiplexers 620 in FIG. 6, and multiplexer 710 may be indicated in front of sampled instruction address registers, such as sampled instruction address register 730, for selecting and routing an interrupt signal from the interrupt channel to become a freeze signal to a sampled instruction address register. The particular interrupt signal that is selected is according to the thread identification value 732 of the sampled instruction address register 730.

Compare units 770 determine that an instruction address on the bus 720 arriving via connecting bus 722 will be stored in the sampled instruction address value 734 of the sampled instruction address register 730 in response to thread identifiers of the instruction address on the bus 720 and the thread identification value 732 of the sampled instruction address register matching.

Figure 8:
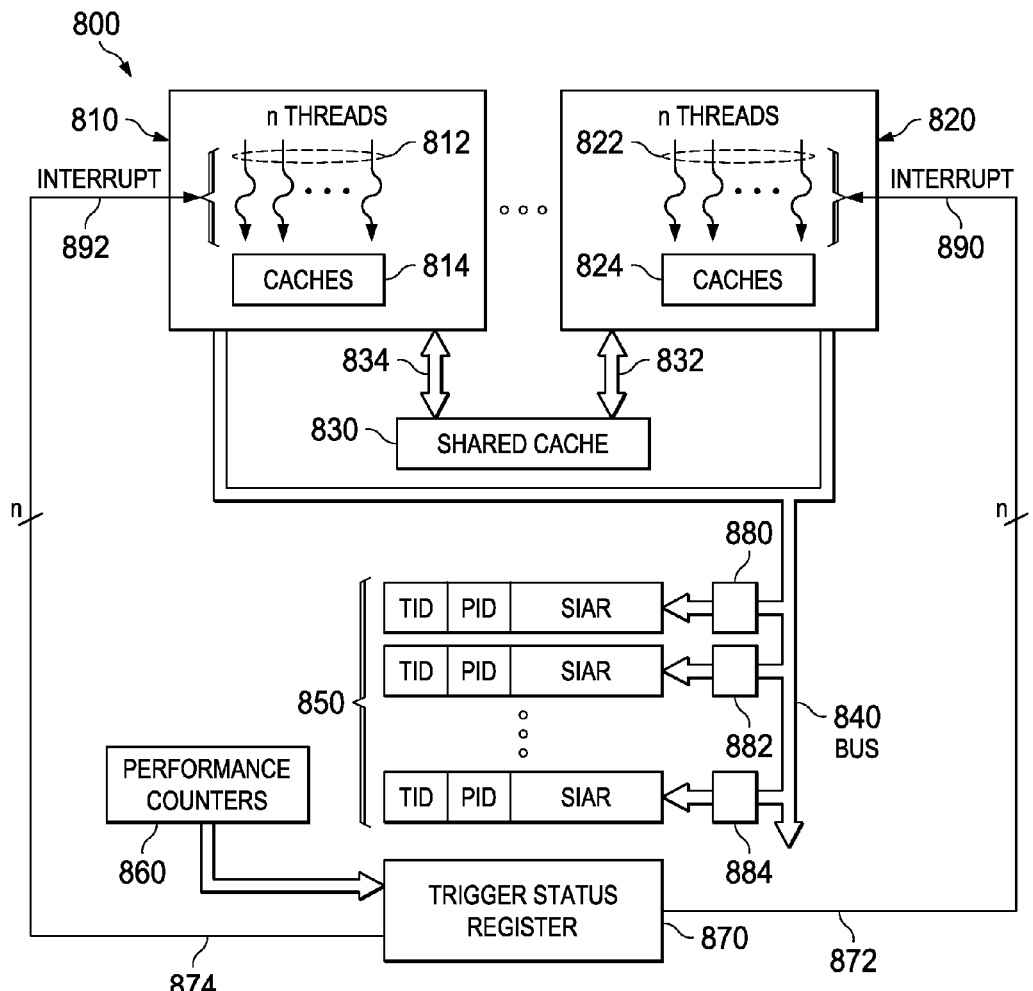
FIG. 8 is an illustration of shared sampled instruction address registers among multiple processor cores in accordance with an illustrative embodiment.

Turning to FIG. 8, an illustration of shared sampled instruction address registers among multiple processor cores is depicted in accordance with an illustrative embodiment. First processor core 810 and second processor core 820 are operably coupled by first bus 840 to a number of sampled instruction address registers 850. Second bus 834 operably couples first processor core 810 to shared cache 830. Third bus 832 operably couples second processor core 820 to shared cache 830. First bus 840, second bus 834, and third bus 832 may be buses such as buses 340 in FIGS. 3 and 440 in FIG. 4. First processor core 810 may have a number of threads 812 running and caches 814. Second processor core 820 may have a number of threads 822 running and caches 824. Performance counters 860 may set a bit in trigger status register 870 upon an occurrence of a trigger condition. Trigger status register 870 interrupts one or more threads of threads 812 in first processor core 810 via first interrupt signal 892 via first interrupt channel 874, and one or more threads in threads 822 in second processor core 820 via second interrupt signal 890 via second interrupt channel 872 and freezes each sampled instruction address register corresponding to each of the interrupted threads via multiplexers similar to multiplexers 620 in FIG. 6. Software instructions, such as program instructions 382 in FIG. 3, that are part of operating system 360, or hypervisor 370 in FIG. 3, may clear the bit in trigger status register 870 after recording a corresponding sample instruction. In response to the bit in trigger status register 870 being cleared, the corresponding sampled instruction address register may be unfrozen. Compare units 880, 882, and 884 may determine whether an instruction address on bus 840 may be stored in a sampled instruction address value of one of the sampled instruction address registers 850, as illustrated in FIG. 9.

Figure 9:
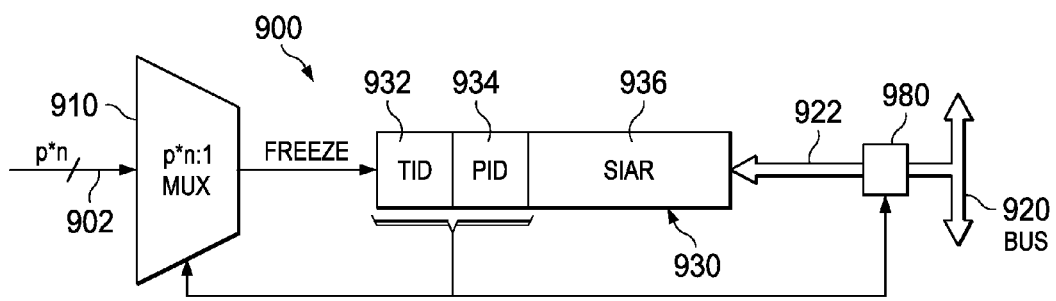
FIG. 9 is a sampled instruction address having a thread identification and a processor identification, and the associated mechanisms to selectively freeze the sampled instruction address register depicted in accordance with an illustrative embodiment.

Referring to FIG. 9, a sampled instruction address having a thread identification, a processor identification, and the associated mechanisms to selectively freeze the sampled instruction address register is depicted in accordance with an illustrative embodiment. Signal 902 from an interrupt channel, such as interrupt channel 874 in FIG. 8, passes through multiplexer 910 to freeze sampled instruction address register 930. Sampled instruction address register 930 receives a thread identification value 932 and processor identification value 934 from system software, such as program instructions 382 in storage 380 in FIG. 3, program instructions that are part of the operating system 360, or of hypervisor 370 in FIG. 3. Bus 920 and connecting bus 922 may be buses such as buses 340 in FIG. 3 and bus 840 in FIG. 8. Multiplexer 910 may be a multiplexer such multiplexer 354 in FIG. 3. Multiplexers such as multiplexer 910 are indicated in front of sampled instruction address registers such as sampled instruction address register 930 for selecting and routing an interrupt signal from the interrupt channel to the freeze signals of the sampled instruction address registers. The particular interrupt signal that is selected is according to the thread identification value 932 and processor identification value 934 of the sampled instruction address register 930. Compare unit 980 determines that an instruction address on the bus 920 arriving via connecting bus 922 will be stored in the sampled instruction address value 936 of the sampled instruction address register 930 in response to thread identifiers and processor identifiers of the instruction address on bus 920 and in response to the thread identification value 932 and processor identification value 934 of the sampled instruction address register matching.

Figure 10:
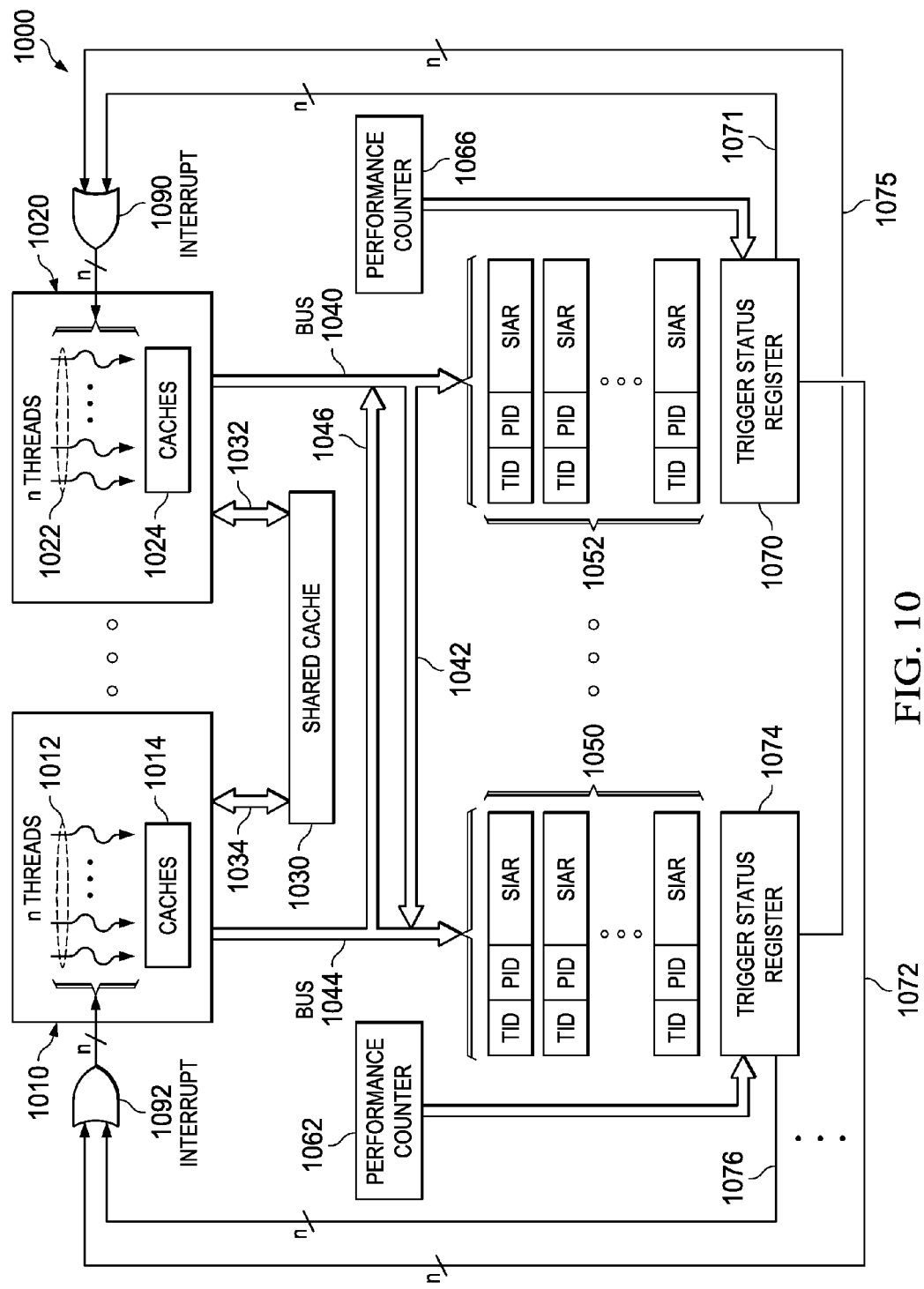
FIG. 10 is an illustration of multiple processor cores with groups of multiple sampled instruction address registers and trigger status registers depicted in accordance with an illustrative embodiment.

Turning to FIG. 10, an illustration of multiple processor cores with groups of multiple sampled instruction address registers and multiple trigger status registers is depicted in accordance with an illustrative embodiment. First processor core 1010 is operably coupled to first sampled instruction address registers 1050 by first bus 1044. Second processor core 1020 is operably coupled to second sampled instruction address registers 1052 by second bus 1040. Third bus 1046 operably couples first bus 1044 to second bus 1040. Fourth bus 1042 operably couples second bus 1040 to first bus 1044. Third bus 1046 and fourth bus 1042 permit sharing of sampled instruction address registers in first sampled instruction address registers 1050 and second sampled instruction address registers 1052. Fifth bus 1034 operably couples first processor core 1010 to shared cache 1030. Sixth bus 1032 operably couples second processor core 1020 to shared cache 1030. First bus 1044, second bus 1040, third bus 1046, fourth bus 1042, fifth bus 1034, and sixth bus 1032 may be buses such as buses 340 in FIGS. 3 and 440 in FIG. 4.

First processor core 1010 may have a number of threads 1012 running and caches 1014. Second processor core 1020 may have a number of threads 1022 running and caches 1024. First performance counter 1062 may set a bit in first trigger status register 1074 upon an occurrence of a trigger condition. Second performance counter 1066 may set a bit in second trigger status register 1070. The bit in first trigger status register 1074 interrupts one or more threads of number of threads 1012 in first processor core 1010 via first interrupt signal 1092 via first interrupt channel 1076, and one or more threads in number of threads 1022 in second processor core 1020 via second interrupt signal 1090 via second interrupt channel 1075. The bit also freezes each sampled instruction address register corresponding to each of the interrupted threads via multiplexers similar to multiplexers 620 in FIG. 6.

The bit in second trigger status register 1070 interrupts one or more threads of number of threads 1012 in first processor core 1010 via first interrupt signal 1092 via third interrupt channel 1072 and one or more threads in number of threads 1022 in second processor core 1020 via second interrupt signal 1090 via fourth interrupt channel 1071. The bit also freezes each sampled instruction address register corresponding to each of the interrupted threads via multiplexers similar to multiplexers 620 in FIG. 6. Software such as program instructions 382 in FIG. 3, program instructions that are part of the operating system 360, or hypervisor 370 may clear the bit in first trigger status register 1074 and in second trigger status register 1070 after recording corresponding sample instructions. In response to the bits in first trigger status register 1074 and in second trigger status register 1070 being cleared, the corresponding sampled instruction address registers may be unfrozen.1

Figure 11:
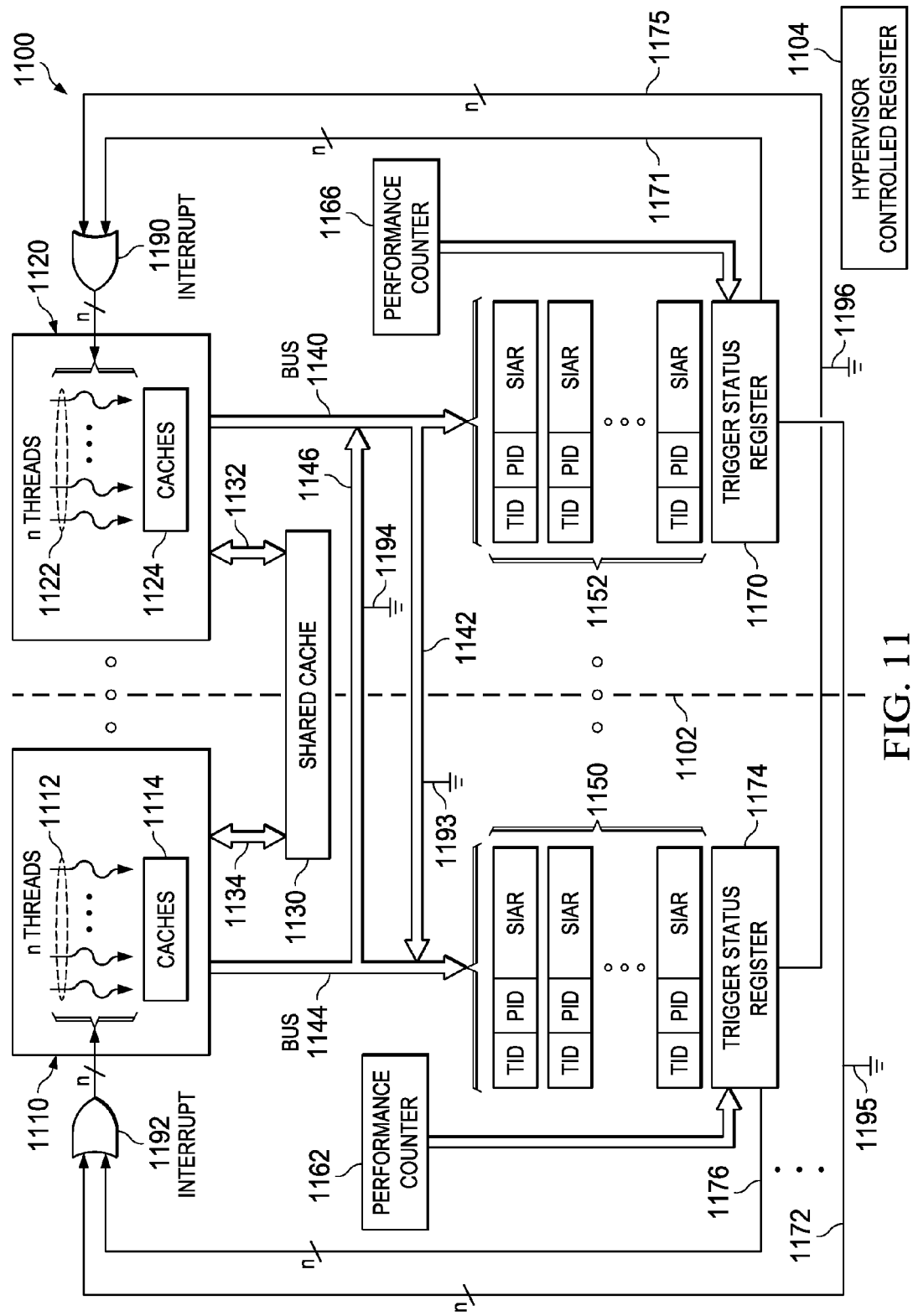
FIG. 11 is an illustration of multiple processor cores with groups of multiple sampled instruction address registers and multiple trigger status registers separated by a boundary depicted in accordance with an illustrative embodiment.

Referring to FIG. 11, an illustration of multiple processor cores with groups of multiple sampled instruction address registers and multiple trigger status registers separated by a boundary is depicted in accordance with an illustrative embodiment. In processing system 1100, boundary 1102 is established by a hypervisor controlled register, such as hypervisor registers 326 in FIGS. 3 and 426 FIG. 4, as will be explained further below.

First processor core 1110 is operably coupled to first sampled instruction address register 1150 by first bus 1144. Second processor core 1120 is operably coupled to second sampled instruction address register 1152 by second bus 1140. Third bus 1146 operably couples first bus 1144 to second bus 1140. Fourth bus 1142 operably couples second bus 1140 to first bus 1144.

Third bus 1146 and fourth bus 1142 permit sharing of sampled instruction address registers in first sampled instruction address registers 1150 and second sampled instruction address registers 1152. Fifth bus 1134 operably couples first processor core 1110 to shared cache 1130. Sixth bus 1132 operably couples second processor core 1120 to shared cache 1130. First bus 1144, second bus 1140, third bus 1146, fourth bus 1142, fifth bus 1134 and sixth bus 1132 may be buses, such as buses 340 in FIGS. 3 and 440 in FIG. 4.

First processor core 1110 may have a number of threads 1112 running and caches 1114. Second processor core 1120 may have a number of threads 1122 running and caches 1124. First performance counter 1162 may set a bit in first trigger status register 1174 upon an occurrence of a trigger condition. Second performance counter 1166 may set a bit in second trigger status register 1170. The bit in first trigger status register 1174 interrupts one or more threads of number of threads 1112 in first processor core 1110 via first interrupt signal 1192 via first interrupt channel 1176, but is prevented from interrupting one or more threads in number of threads 1122 in second processor core 1120 via second interrupt signal 1190 via second interrupt channel 1175 by boundary 1102. The bit also freezes each sampled instruction address register corresponding to each of the interrupted threads via multiplexers similar to multiplexers 620 in FIG. 6.

The bit in second trigger status register 1170 interrupts one or more threads in number of threads 1122 in second processor core 1120 via second interrupt signal 1190 via fourth interrupt channel 1171, but is prevented from interrupting one or more threads of number of threads 1112 in first processor core 1110 via first interrupt signal 1192 via third interrupt channel 1172 by boundary 1102. The bit also freezes each sampled instruction address register corresponding to each of the interrupted threads via multiplexers similar to multiplexers 620 in FIG. 6. Software instructions, such as interrupt handler 384 in program instructions 382 in FIG. 3, that are part of the operating system 360, or hypervisor 370 in FIG. 3, may clear the bit in first trigger status register 1174 and in second trigger status register 1170 after recording corresponding sample instructions. In response to the bits in first trigger status register 1174 and in second trigger status register 1170 being cleared, the corresponding sampled instruction address registers may be unfrozen.

The illustrative embodiments recognize and take into account that one way in which boundary 1102 may control shared sampled instruction address registers such as shared sampled instruction address registers 1150 and 1152 may be by zeroing out signal points such as first zero point 1193 on fourth bus 1142, second zero point 1194 on third bus 1146, fourth zero point 1195 on third interrupt channel 1172 and fourth zero point 1196 on second interrupt channel 1175.

Figure 12:
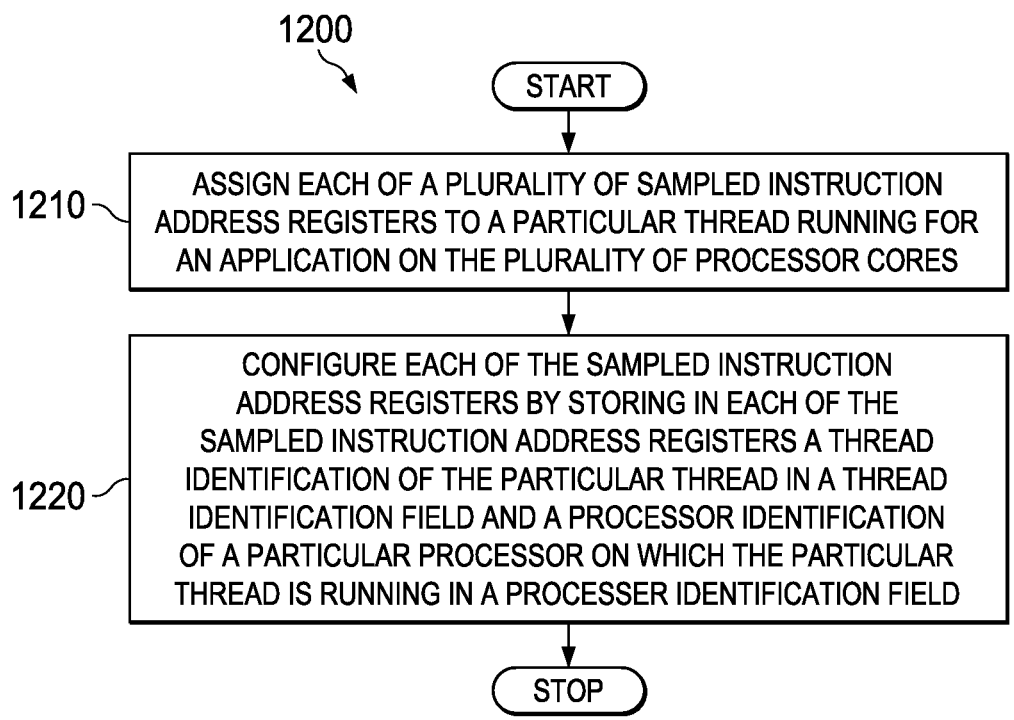
FIG. 12 is a flowchart of a process for sharing sampled instruction address registers on a plurality of processor cores depicted in accordance with an illustrative embodiment.

Turning to FIG. 12, a flowchart of a process for sharing sampled instruction address registers on a plurality of processor cores is depicted in accordance with an illustrative embodiment. Process 1200 starts by assigning each of a plurality of sampled instruction address registers to a particular thread running for an application on the plurality of processor cores (step 1210). Process 1200 then configures each of the sampled instruction address registers by storing in each of the sampled instruction address registers a thread identification of the particular thread in a thread identification field and a processor identification of a particular processor on which the particular thread is running in a processer identification field (step 1220) and terminates thereafter.

Figure 13:
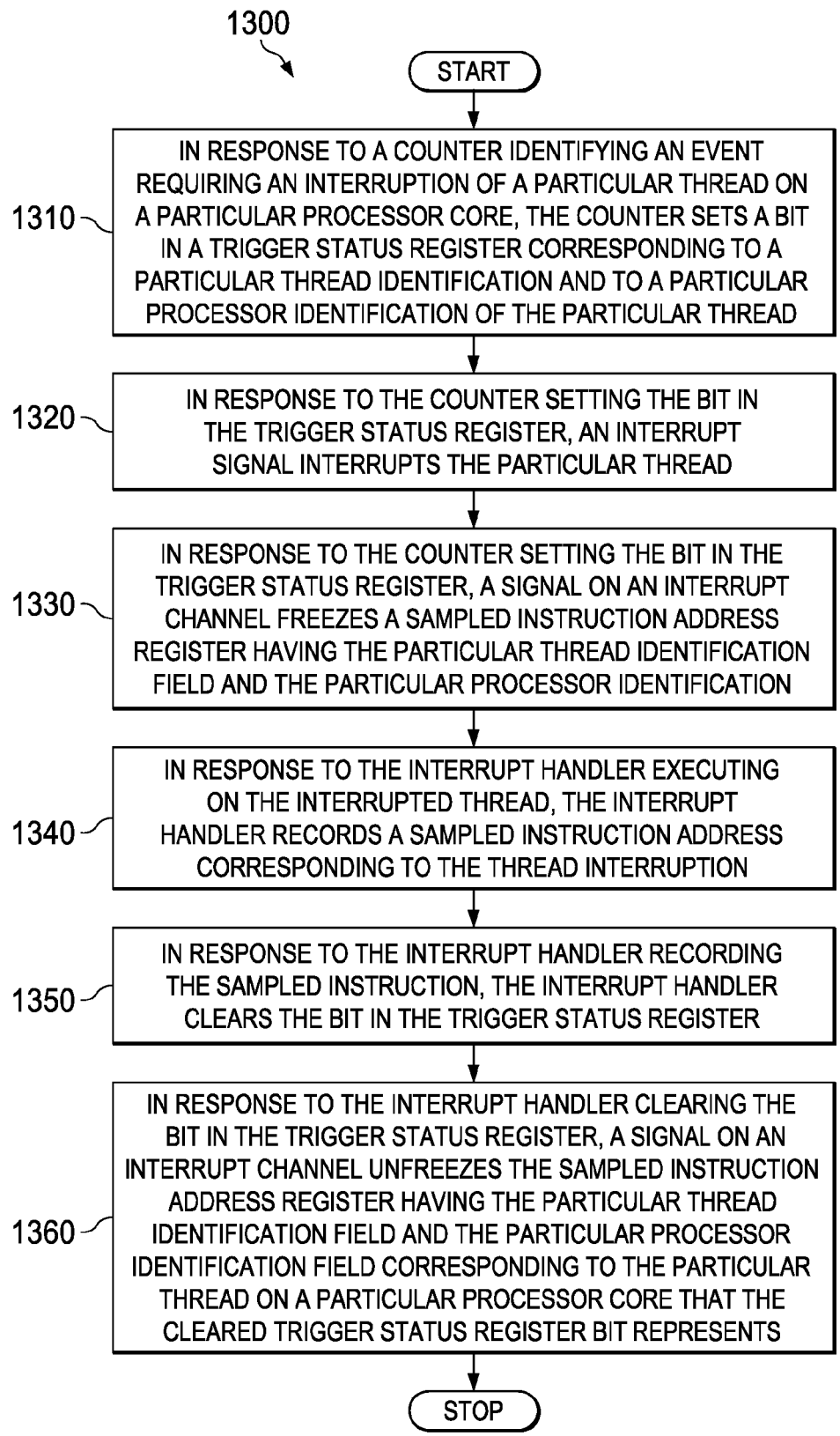
FIG. 13 is a flowchart of a process for freezing a sampled instruction address register depicted in accordance with an illustrative embodiment.

Referring to FIG. 13, a flowchart of a process for freezing a sampled instruction address register is depicted in accordance with an illustrative embodiment. In response to a counter identifying an event requiring an interruption of a particular thread on a particular processor core, the counter sets a bit in a trigger status register corresponding to a particular thread identification and to a particular processor identification of the particular thread (step 1310). In response to the counter setting the bit in the trigger status register, an interrupt signal interrupts the particular thread (step 1320). In response to the counter setting the bit in the trigger status register, a signal on an interrupt channel freezes a sampled instruction address register having the particular thread identification field and the particular processor identification (step 1330). In response to the interrupt handler executing on the interrupted thread, the interrupt handler records a sampled instruction address corresponding to the thread interruption (step 1340). In response to the interrupt handler recording the sampled instruction, the interrupt handler clears the bit in the trigger status register (step 1350). In response to the interrupt handler clearing the bit in the trigger status register, a signal on an interrupt channel unfreezes the sampled instruction address register having the particular thread identification field and the particular processor identification field corresponding to the particular thread on a particular processor core that the cleared trigger status register bit represents (step 1360) and terminates thereafter.

Figure 14:
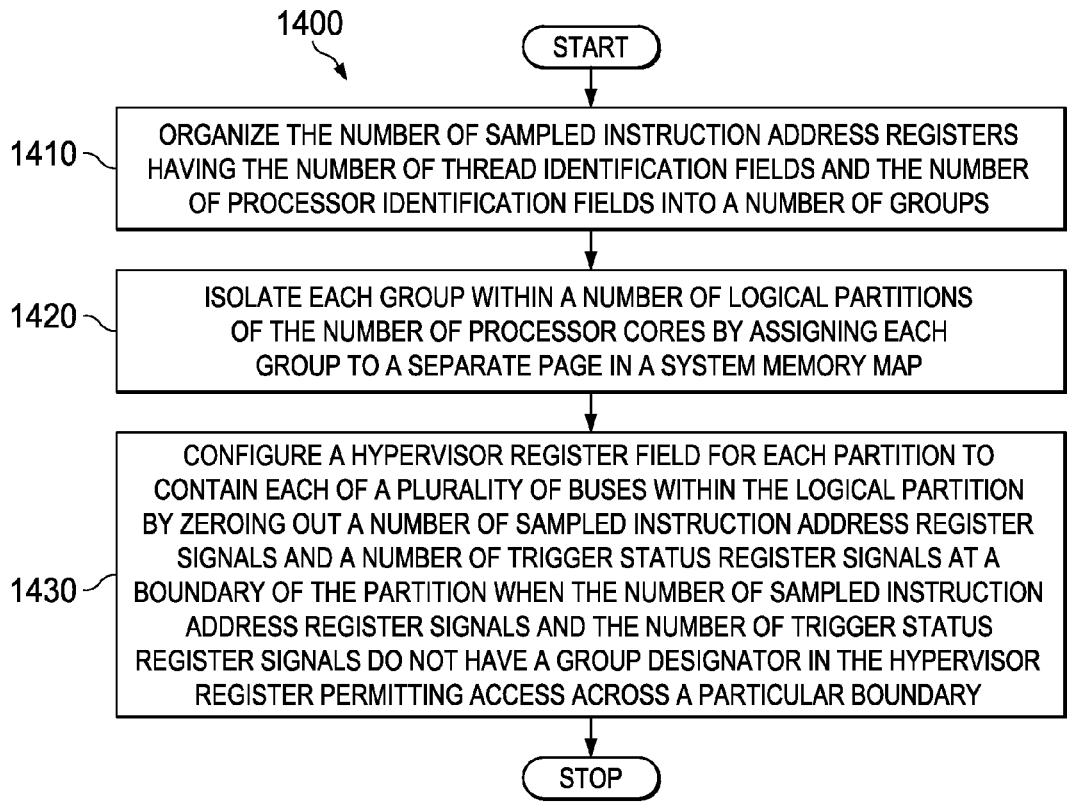
FIG. 14 is a flowchart of a process for isolating a number of sampled instruction registers by a hypervisor register depicted in accordance with an illustrative embodiment.

Turning to FIG. 14, a flowchart of a process for isolating a number of sampled instruction address registers by a hypervisor register is depicted in accordance with an illustrative embodiment. Process 1400 starts by organizing the number of sampled instruction address registers having the number of thread identification fields and the number of processor identification fields into a number of groups (step 1410). Process 1400 isolates each group within a number of logical partitions of the number of processor cores by assigning each group to a separate page in a system memory map (step 1420). Process 1400 configures a hypervisor register field for each partition to contain each of a plurality of buses within the logical partition by zeroing out a number of sampled instruction address register signals and a number of trigger status register signals at a boundary of the partition in response to the number of sampled instruction address register signals and the number of trigger status register signals do not have a group designator in the hypervisor register permitting access across a particular boundary (step 1430) and terminates thereafter.

Figure 15:
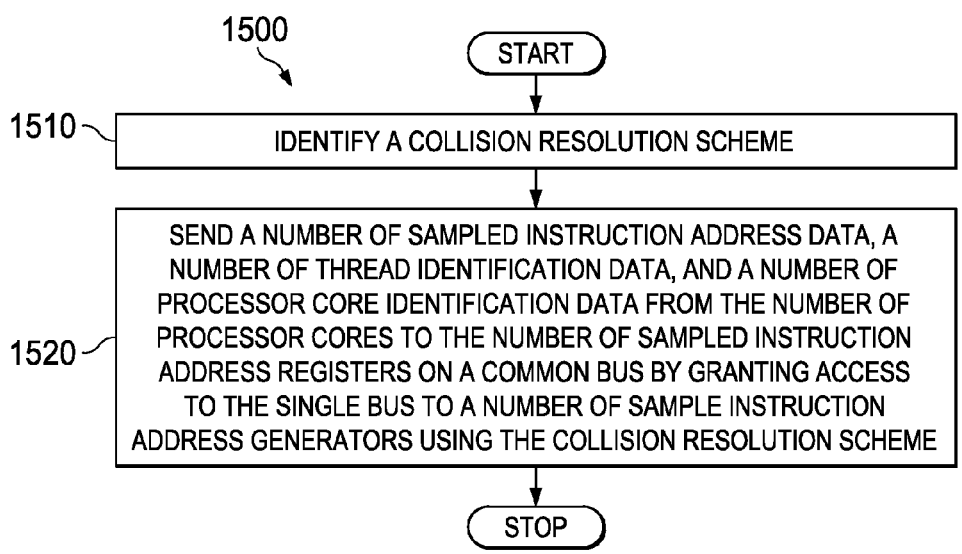
FIG. 15 is a flowchart for employing a collision resolution scheme depicted in accordance with an illustrative embodiment.

Referring to FIG. 15, a flowchart for employing a collision resolution scheme is depicted in accordance with an illustrative embodiment. Process 1500 starts by identifying a collision resolution scheme (step 1510). Process 1500 sends a number of sampled instruction address data, a number of thread identification data, and a number of processor core identification data from the number of processor cores to the number of sampled instruction address registers on a common bus by granting access to the single bus to a number of sample instruction address generators using the collision resolution scheme (step 1520) and terminates thereafter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing. Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks. Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," as used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Aspects of the present invention have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   assigning each of a plurality of sampled instruction address registers to a particular thread running for an application on the plurality of processor cores;
   configuring each of the plurality of sampled instruction address registers by storing, in each of the plurality of sampled instruction address registers, a thread identification of the particular thread in a thread identification field and a processor identification of the particular thread in a processer identification field;
   setting, by a counter, a bit in a trigger status register corresponding to a particular thread identification and to a particular processor identification of the particular thread in response to the counter identifying an event requiring an interruption of the particular thread on a particular processor core;
   interrupting, by an interrupt signal, the particular thread in response to the counter setting the bit in the trigger status register;
   freezing, by a first signal on an interrupt channel, a sampled instruction address register having the particular thread identification field and the particular processor identification field in response to the counter setting the bit in the trigger status register;
   recording, by an interrupt handler, a sampled instruction corresponding to the particular thread that was interrupted in response to an interrupt handler executing on the particular thread;
   clearing the bit in the trigger status register by the interrupt handler in response to the interrupt handler recording the sample instruction; and
   unfreezing, via a second signal on the interrupt channel, the sampled instruction address register having the particular thread identification field and the particular processor identification field corresponding to the particular thread on the particular processor core that the cleared trigger status register bit represents in response to the interrupt handler clearing the bit in the trigger status register.

2. The method of claim 1 further comprising:
   organizing a number of sampled instruction address registers having a number of thread identification fields and a number of processor identification fields into a number of groups; and
   isolating the number of groups within a number of logical partitions of the plurality of processor cores by assigning each group of the number of groups to a separate page in a system memory map and using a number of page attributes to provide an isolation.

3. The method of claim 1 further comprising:
   configuring a processor with a circuit that organizes a number of sampled instruction address registers having a number of thread identification fields and a number of processor identification fields into a number of groups and that isolates each group within a number of logical partitions of a number of processor cores by assigning each group to a separate page in a system memory map and using a number of page attributes to provide an isolation.

4. The method of claim 2 further comprising:
   configuring a register field for each concurrent partition to contain each of a plurality of buses within the logical partition by zeroing out a number of sampled instruction address register signals and a number of trigger status register signals at a boundary of the partition in response to the number of sampled instruction address register signals and the number of trigger status register signals not having a group designator in the hypervisor register permitting access across a particular boundary.

5. The method of claim 1 further comprising:
   sending a number of sampled instruction address data, a number of thread identification data, and a number of processor core identification data from a number of processor cores to a number of sampled instruction address registers on a common bus by granting access to a single bus to a number of sample instruction address generators using a collision resolution scheme.

6. A system comprising:
   a plurality of processor cores operably coupled by a number of interrupt channels and buses to a plurality of counters, to a sampled instruction address register, and to a trigger status register;
   a processor operably coupled to a computer readable memory, to a computer readable storage medium, and to a number of chips containing the plurality of processor cores;
   a plurality of instructions embodied in the computer readable storage medium configured to execute, via the computer readable memory, on the processor to perform actions comprising:
   assigning each of a plurality of sampled instruction address registers to a particular thread running for an application on the plurality of processor cores;
   configuring each of the plurality of sampled instruction address registers by storing in each of the sampled instruction address registers a thread identification of the particular thread in a thread identification field and a processor identification of the particular thread in a processor identification field;
   wherein each of the sampled instruction address registers is recorded by a circuit of a chip in response to each of the sampled instruction address registers being configured with a particular thread identification and a particular processor identification;
   wherein, responsive to a counter in a processor core identifying an event requiring an interruption of a particular thread on the particular processor core, the counter sets a bit in a particular trigger status register corresponding to a particular thread identification and to a particular processor identification of the particular thread;

wherein, responsive to the counter setting the bit in the trigger status register, an interrupt signal interrupts the particular thread;

wherein, responsive to the counter setting the bit in the trigger status register, a first signal on an interrupt channel freezes a sampled instruction address register having the particular thread identification field and the particular processor identification field;

wherein the first signal on the interrupt channel freezes the sampled instruction address register having the particular thread identification field and the particular processor identification field so that any other sampled instruction address register assigned to any other threads are unaffected by the first signal; and a second signal on the interrupt channel that, responsive to an interrupt handler clearing the trigger status register, unfreezes the corresponding sampled instruction address register for the particular thread so that any other sampled instruction address registers assigned to any other threads are unaffected by the second signal.

7. The system of claim 6, wherein the plurality of instructions further comprise:

organizing the number of sampled instruction address registers having the number of thread identification fields and the number of processor identification fields into a number of groups;

isolating each group within a number of logical partitions of the plurality of processor cores by assigning each group to a separate page in a system memory map and using a number of page attributes to provide an isolation by identifying the logical partitions that can access each group; and assigning a number of access rights to the number of sampled instruction address registers by one of an individual, an operating system, and a hypervisor.

8. The system of claim 7, wherein the plurality of instructions further comprise: configuring a field in a hypervisor register for each partition to contain each of a plurality of buses within the logical partition by zeroing out a number of sampled instruction address register signals and a number of trigger status register signals at a boundary of the partition in response to the number of sampled instruction address register signals and the number of trigger status register signals do not have a group designator in the hypervisor register permitting access across a particular boundary.

9. The system of claim 6 further comprising:

a plurality of buses operably coupling each of the plurality of processor cores to one or more of a plurality of computer readable memories, wherein the plurality of buses are operably coupled with a processor core and extend outside of the processor core operably coupling the processor core to the plurality of computer readable memories;

a plurality of performance sampled instruction address registers operably coupled to a plurality of triggers status registers; and a plurality of interrupt channels operably coupling the plurality of trigger status registers to the plurality of processor cores.

10. The system of claim 9 further comprising:

wherein the circuit in the chip organizes a number of sampled instruction address registers having a number of thread identification fields and a number of processor identification fields into a number of groups;

wherein the circuit in the chip isolates each group within a number of logical partitions of the number of processor cores by assigning each group to a separate page in a system memory map and uses a number of page attributes to provide isolation by identifying the logical partitions that can access each group; and wherein the circuit assigns a number of access rights to a number of registers by one of an individual, an operating system, or a hypervisor.

11. The system of claim 6 further comprising:

wherein the circuit sends a number of sampled instruction address data, a number of thread identification data, and a number of processor core identification data from the number of processor cores to a number of sampled instruction address registers on a common bus by granting access to a single bus to a number of sample instruction address generators using a collision resolution scheme.

12. A computer program product comprising:

one or more non-transitory computer readable storage devices;

computer readable program code stored on at least one non-transitory compute readable storage device for assigning each of a plurality of sampled instruction address registers to a particular thread running for an application on the plurality of processor cores;

computer readable program code stored on at least one non-transitory compute readable storage device for configuring each of the plurality of sampled instruction address registers by storing, in each of the plurality of sampled instruction address registers, a thread identification of the particular thread in a thread identification field and a processor identification of the particular thread in a processer identification field;

computer program instructions stored on at least one non-transitory compute readable storage device for setting, by a counter, a bit in a trigger status register corresponding to a particular thread identification and to a particular processor identification of the particular thread in response to the counter identifying an event requiring an interruption of the particular thread on a particular processor core;

computer program instructions stored on at least one non-transitory compute readable storage device for interrupting, by an interrupt signal, the particular thread in response to the counter setting the bit in the trigger status register;

computer program instructions stored on at least one non-transitory compute readable storage device for freezing, by a first signal on an interrupt channel, a sampled instruction address register having the particular thread identification field and the particular processor identification field in response to the counter setting the bit in the trigger status register;

computer program instructions stored on at least one non-transitory compute readable storage device for recording, by an interrupt handler, a sampled instruction corresponding to the particular thread that was interrupted in response to an interrupt handler executing on the particular thread;

computer program instructions stored on at least one non-transitory compute readable storage device for clearing the bit in the trigger status register by the interrupt handler in response to the interrupt handler recording the sample instruction; and computer program instructions stored on at least one non-transitory compute readable storage device for unfreezing, via a second signal on the interrupt channel, the sampled instruction address register having the particular thread identification field and the particular processor identification field corresponding to the particular thread on the particular processor core that the cleared trigger status register bit represents in response to the interrupt handler clearing the bit in the trigger status register.

13. The computer program product of claim 12 further comprising:

- computer readable program code stored on at least one non-transitory compute readable storage device for organizing the number of sampled instruction address registers having the number of thread identification fields and the number of processor identification fields into a number of groups;
- computer readable program code stored on at least one non-transitory compute readable storage device for isolating each group within a number of logical partitions of a number of processor cores by assigning each group to a separate page in a system memory map and using a number of page attributes to provide isolation by identifying the logical partitions that can access each group; and
- computer readable program code stored on at least one non-transitory compute readable storage device for assigning a number of access rights to a number of sampled instruction address registers by one of an individual, an operating system, and a hypervisor.

14. The computer program product of claim 12 further comprising:

- computer readable program code stored on at least one non-transitory compute readable storage device for configuring a field in a hypervisor register for each partition to contain each of a plurality of buses within a logical partition by zeroing out a number of sampled instruction address register signals and a number of trigger status register signals at a boundary of the partition in response to the number of sampled instruction address register signals and the number of trigger status register signals do not have a group designator in the hypervisor register permitting access across a particular boundary.

* * * * *